(12) United States Patent
Gu et al.

(10) Patent No.: US 11,328,527 B2
(45) Date of Patent: May 10, 2022

(54) ULTRASONIC FINGERPRINT SENSOR, DISPLAY SUBSTRATE AND DRIVING METHOD THEREOF, AND DISPLAY DEVICE

(71) Applicant: BOE TECHNOLOGY GROUP CO., LTD., Beijing (CN)

(72) Inventors: Pinchao Gu, Beijing (CN); Xue Dong, Beijing (CN); Haisheng Wang, Beijing (CN); Chunwei Wu, Beijing (CN); Yingming Liu, Beijing (CN); Rui Xu, Beijing (CN); Changfeng Li, Beijing (CN); Yanan Jia, Beijing (CN); Yuzhen Guo, Beijing (CN); Yunke Qin, Beijing (CN); Lijun Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 668 days.

(21) Appl. No.: 16/316,493

(22) PCT Filed: Feb. 12, 2018

(86) PCT No.: PCT/CN2018/076490
§ 371 (c)(1),
(2) Date: Jan. 9, 2019

(87) PCT Pub. No.: WO2019/010982
PCT Pub. Date: Jan. 17, 2019

(65) Prior Publication Data
US 2021/0334491 A1 Oct. 28, 2021

(30) Foreign Application Priority Data
Jul. 13, 2017 (CN) .......................... 201710570912.6

(51) Int. Cl.
*G06K 9/00* (2022.01)
*G06V 40/13* (2022.01)

(52) U.S. Cl.
CPC ................ *G06V 40/1306* (2022.01)

(58) Field of Classification Search
CPC .................................................. G06K 9/0002
See application file for complete search history.

(56) References Cited

U.S. PATENT DOCUMENTS 9,547,384 B2  1/2017  Zhang
9,639,220 B2  5/2017  Wang
(Continued)

FOREIGN PATENT DOCUMENTS

CN  102830850 A  12/2012
CN  102955639 A  3/2013
(Continued)

OTHER PUBLICATIONS

International Search Report dated May 16, 2018 issued in corresponding International Application No. PCT/CN2018/076490.
(Continued)

*Primary Examiner* — Edward F Urban
*Assistant Examiner* — Wassim Mahrouka
(74) *Attorney, Agent, or Firm* — Nath, Goldberg & Meyer; Joshua B. Goldberg (57) ABSTRACT

The present disclosure provides an ultrasonic fingerprint sensor, a display substrate, a driving method thereof and a display device. The ultrasonic fingerprint sensor includes: a base substrate; a driving structure provided on the base substrate and configured to transmit an ultrasonic signal; a receiving structure provided on the base substrate and configured to receive the ultrasonic signal reflected by a finger, and convert the ultrasonic signal into an electrical signal for determining fingerprint information, the driving structure
(Continued)

and the receiving structure are provided in a same plane. Since the driving structure and the receiving structure of the ultrasonic fingerprint sensor of the present disclosure are in a same plane, the driving structure can be closer to the touch body (for example, a finger), which is advantageous for the ultrasonic waves generated by the driving structure to reach the finger to improve the touch accuracy.

20 Claims, 4 Drawing Sheets

(56) References Cited

U.S. PATENT DOCUMENTS

| | | | |
|---|---|---|---|
| 9,772,723 | B2 | 9/2017 | Wang et al. |
| 10,025,411 | B2 | 7/2018 | Wang et al. |
| 2014/0354905 | A1* | 12/2014 | Kitchens ............ G01S 7/52085 349/12 |
| 2016/0107194 | A1 | 4/2016 | Panchawagh et al. |
| 2017/0147850 | A1 | 5/2017 | Liu et al. |

FOREIGN PATENT DOCUMENTS

| | | |
|---|---|---|
| CN | 103049156 A | 4/2013 |
| CN | 104881196 A | 9/2015 |
| CN | 105183257 A | 12/2015 |
| CN | 103353818 B | 7/2016 |
| CN | 205451007 U | 8/2016 |
| CN | 205691915 U | 11/2016 |
| CN | 106782085 A | 5/2017 |
| CN | 106782085 A * | 5/2017 |
| CN | 107194384 A | 9/2017 |
| CN | 107195661 A | 9/2017 |
| CN | 107220630 A | 9/2017 |
| CN | 107403135 A * | 11/2017 |
| WO | 2014183395 A1 | 11/2014 |
| WO | 2015154361 A1 | 10/2015 |
| WO | 2015180288 A1 | 12/2015 |

OTHER PUBLICATIONS

Office Action dated Jun. 11, 2018 issued in corresponding Chinese Application No. 201710570912.6.
Office Action dated Feb. 26, 2019 issued in corresponding Chinese Application No. 201710570912.6.

* cited by examiner

ULTRASONIC FINGERPRINT SENSOR, DISPLAY SUBSTRATE AND DRIVING METHOD THEREOF, AND DISPLAY DEVICE

This is a National Phase application filed under 35 U.S.C. 371 as a national stage of PCT/CN2018/076490, filed Feb. 12, 2018, an application claiming the benefit of Chinese Application No. 201710570912.6, filed Jul. 13, 2017, the entire disclosure of which is hereby incorporated by reference.

TECHNICAL FIELD

The present disclosure relates to the field of display technology, and in particular, relates to an ultrasonic fingerprint sensor, a display substrate and a driving method thereof and a display device.

BACKGROUND

Fingerprints are inherent characteristics of a human body, are unique for everyone and distinguishable from others. A fingerprint consists of a series of ridges and valleys on a skin surface of a fingertip. Details of the ridges and valleys usually include ridge bifurcation, ridge ending, arch (e.g., tent-shaped arch), left loop, right loop, whorl or twin loop, etc., these details determine uniqueness of each fingerprint. The fingerprint recognition technology developed due to the uniqueness of each fingerprint is an early technology used to personal identity authentication. According to different methods for fingerprint acquisition and input, widely used and well-known fingerprint recognition technologies include optical imaging, thermal sensor, human infrared sensor, and the like.

A novel device with fingerprint recognition function and a driving method thereof are provided in the present disclosure.

SUMMARY

The present disclosure provides a display substrate and a driving method thereof and a display device, which have fingerprint recognition function.

An embodiment of the present disclosure provides an ultrasonic fingerprint sensor, including: a base substrate; a driving structure provided on the base substrate and configured to transmit an ultrasonic signal; a receiving structure provided on the base substrate and configured to receive the ultrasonic signal reflected by a finger, and convert the ultrasonic signal into an electrical signal for determining fingerprint information, the driving structure and the receiving structure are provided in a same plane.

In an implementation, the driving structure includes a second electrode, a first piezoelectric material layer and a first electrode sequentially provided on the base substrate; and the receiving structure includes a fourth electrode, a second piezoelectric material layer and a third electrode sequentially provided on the base substrate.

In an implementation, the first piezoelectric material layer and the second piezoelectric material layer are provided in a same layer and made of a same material.

In an implementation, the first electrode and the third electrode are provided in a same layer and are made of a same material; and/or the second electrode and the fourth electrode are provided in a same layer and made of a same material.

Another embodiment of the present disclosure provides a display substrate including the ultrasonic fingerprint sensor described above.

In an implementation, the display substrate further includes a plurality of pixel regions and areas between every two adjacent pixel regions, the driving structure and the receiving structure of each ultrasonic fingerprint sensor are provided in two adjacent areas of the areas respectively.

In an implementation, the display substrate further includes a plurality of pixel regions and areas between every two adjacent pixel regions, the driving structure and the receiving structure of each ultrasonic fingerprint sensor are provided in one of the areas.

In an implementation, the display substrate further includes a plurality of pixel regions and areas between every two adjacent pixel regions, the driving structure and the receiving structure of each of a portion of ultrasonic fingerprint sensors are provided in one of the areas, the driving structure and the receiving structure of each of the remaining portion of ultrasonic fingerprint sensors are provided in two adjacent areas of the areas respectively.

In an implementation, the driving structure includes a second electrode, a first piezoelectric material layer and a first electrode sequentially provided on the base substrate; and the receiving structure includes a fourth electrode, a second piezoelectric material layer and a third electrode sequentially provided on the base substrate.

In an implementation, the first piezoelectric material layer and the second piezoelectric material layer are provided in a same layer and made of a same material.

In an implementation, the first electrode and the third electrode are provided in a same layer and are made of a same material; and/or the second electrode and the fourth electrode are provided in a same layer and made of a same material.

In an implementation, the display substrate is a color filter substrate, a black matrix is provided in the areas, and through holes are provided in the black matrix, and the driving structure and the receiving structure in each of the fingerprint recognition sensors are provided in the through holes of the black matrix.

In an implementation, the display substrate is an array substrate, pixel driving circuits are provided in the areas, and the driving structure and the receiving structure in each of the fingerprint recognition sensors are provided above the pixel driving circuits.

In an implementation, the display substrate further includes a fingerprint detection circuit configured to determine fingerprint information according to an electrical signal output by the receiving structure.

Still another embodiment of the present disclosure provides a driving method for the display substrate described above, the driving method comprising steps of: applying a driving voltage to the driving structure to drive the driving structure to generate an ultrasonic signal; receiving, by the receiving structure, the ultrasonic signal reflected by a finger; and determining fingerprint information by converting the ultrasonic signal into an electrical signal.

In an implementation, while the step of receiving, by the receiving structure, the ultrasonic signal reflected by a finger, and the step of determining fingerprint information by converting the ultrasonic signal into an electrical signal are performed, no driving voltage is applied to the driving structure.

Still another embodiment of the present disclosure provides a display device including the display substrate described above.

DETAILED DESCRIPTION

To make those skilled in the art understand the technical solutions of the present disclosure better, the present disclosure will be further described in detail below with reference to the accompanying drawings and specific embodiments.

Figure 1:
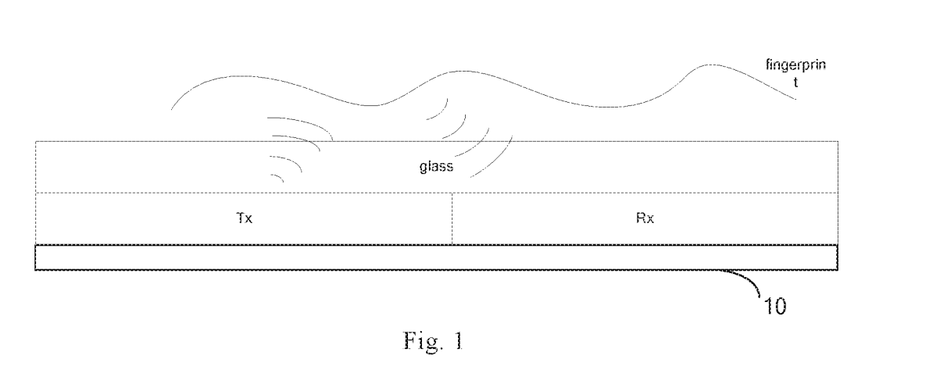
FIG. 1 is a schematic structural diagram of an ultrasonic fingerprint sensor according to an embodiment of the present disclosure.

FIG. 1 is a schematic structural diagram of an ultrasonic fingerprint sensor according to an embodiment of the present disclosure. As shown in FIG. 1, the ultrasonic fingerprint sensor in the present embodiment includes: a base substrate 10; a driving structure Tx provided on the base substrate and configured to transmit an ultrasonic signal; and a receiving structure Rx provided on the base substrate and configured to receive the ultrasonic signal reflected by a finger and convert it into an electrical signal for determining fingerprint information, the driving structure Tx and the receiving structure Rx are provided in a same plane.

In the ultrasonic fingerprint sensor of the present embodiment, the driving structure Tx and the receiving structure Rx are provided in a same plane, that is, both the driving structure Tx and the receiving structure Rx are completely in a same layer, compared with an arrangement in which the driving structure Tx and the receiving structure Rx are superimposed in a vertical direction in the prior art, the driving structure Tx and the receiving structure Rx in the present embodiment are arranged side by side in a same horizontal plane, so that the driving structure Tx can be closer to the touch body (for example, a finger), which is advantageous for the ultrasonic waves generated by the driving structure Tx to reach the finger, so as to improve touch accuracy. The specific arrangement of the driving structure Tx and the receiving structure Rx will be described in conjunction with the following embodiments.

Figure 2A:
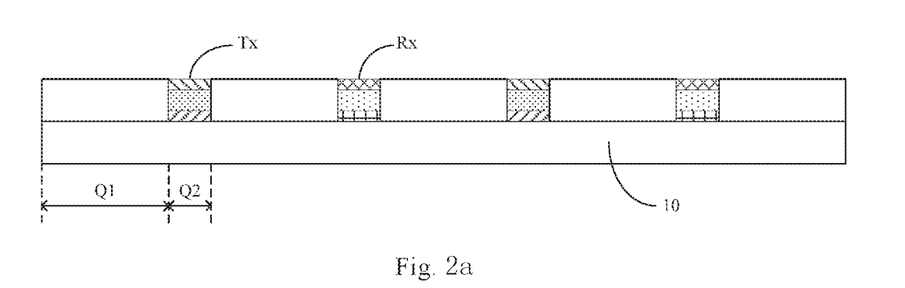
FIGS. 2a to 2c are schematic structural diagrams of a display substrate according to an embodiment of the present disclosure.
Figure 2B:
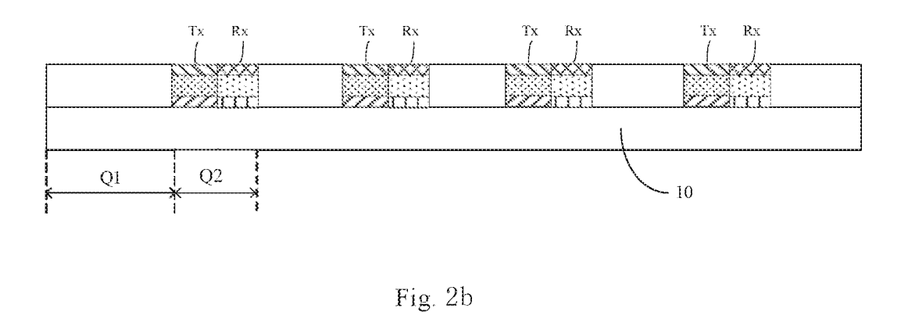
Figure 2C:
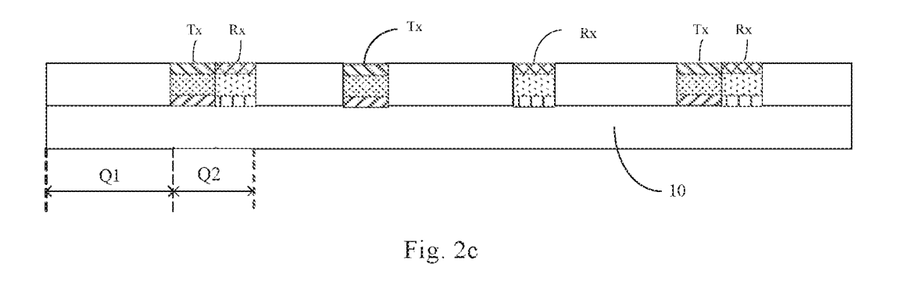

FIGS. 2a to 2c are respectively schematic structural diagrams of a display substrate according to an embodiment of the present disclosure. As shown in FIG. 2a, the present embodiment provides a display substrate including a plurality of pixel regions Q1 provided above the base substrate 10 and a plurality of light blocking regions Q2 provided between every two adjacent pixel regions Q1. The display substrate further includes a plurality of the ultrasonic fingerprint sensors shown in FIG. 1. The driving structure Tx and the receiving structure Rx of each ultrasonic fingerprint sensor may be provided in one of the light blocking regions Q2 or in two adjacent light blocking regions Q2 respectively. FIG. 2a shows a case where the driving structure Tx and the receiving structure Rx are respectively provided in two adjacent light blocking regions Q2. In the present disclosure, although the driving structure Tx and the receiving structure Rx of the ultrasonic fingerprint sensor being provided in the light blocking regions Q2 between the pixel regions Q1 is described, the present disclosure is not limited thereto, and the driving structure Tx and the receiving structure Rx of the ultrasonic fingerprint sensor may also be provided in other regions.

Since the driving structure Tx and the receiving structure Rx of the ultrasonic fingerprint sensor in the present embodiment are both provided in the light blocking region(s) Q2, the aperture ratio of the display substrate is not affected. At the same time, the driving structure Tx and the receiving structure Rx are completely provided in a same layer. Compared with the prior art, the driving structure Tx can be closer to the touch body (such as a finger), which is advantageous for the ultrasonic waves generated by the driving structure Tx to reach the finger, so as to improve touch accuracy. In addition, in a case where the driving structure Tx and the receiving structure Rx are respectively provided in two adjacent light blocking regions Q2, the driving structure Tx and the receiving structure Rx in each ultrasonic fingerprint sensor are separated by one pixel region Q1, thereby avoiding occurring of interference between a signal transmitted by the driving structure Tx and a signal received by the receiving structure Rx as much as possible, so that the valleys and the ridges of the fingerprint can be recognized more clearly.

Except for the case where the driving structure Tx and the receiving structure Rx of each ultrasonic fingerprint sensor are separately provided in two adjacent light blocking regions Q2, the driving structure Tx and the receiving structure Rx of each ultrasonic fingerprint sensor may be provided in one of the light blocking regions Q2, as shown in FIG. 2b. In this implementation, there is no need to add additional sub-pixels, which saves space in the display area. The material of the driving structure Tx and the receiving structure Rx is opaque, thus can block light.

Figure 3:
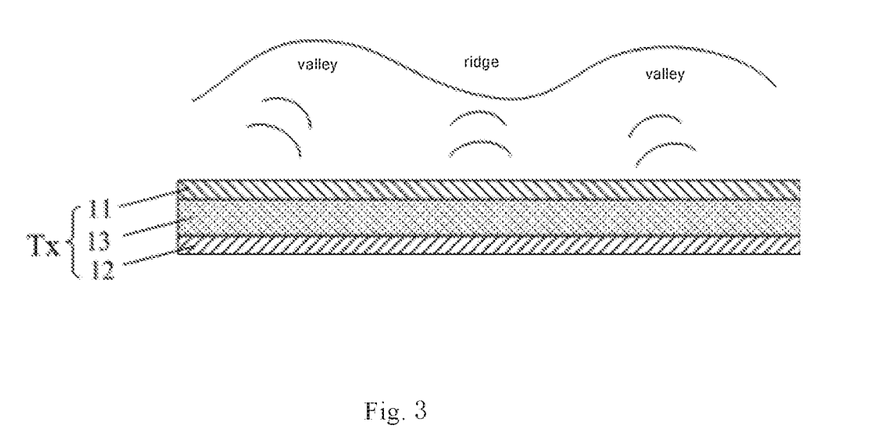
FIG. 3 is a schematic diagram of a driving structure of a display substrate according to an embodiment of the present disclosure.
Figure 4:
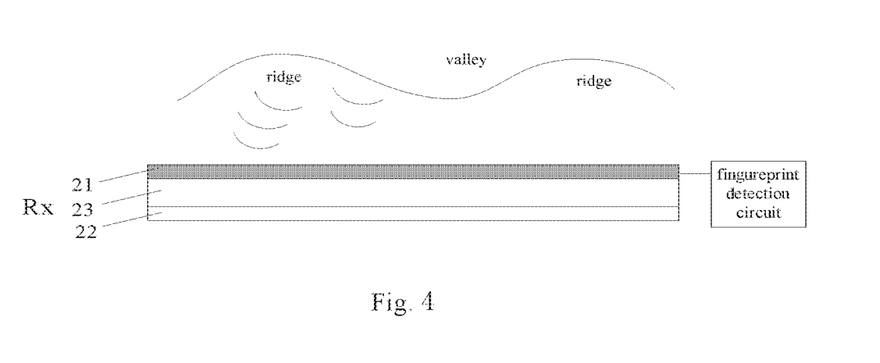
FIG. 4 is a schematic diagram of a receiving structure of a display substrate according to an embodiment of the present disclosure.

In addition, the driving structure Tx and the receiving structure Rx of each of a portion of the ultrasonic fingerprint sensors may be separately provided in two adjacent light blocking regions Q2, and the driving structure Tx and the receiving structure Rx of each of the other portion of the ultrasonic fingerprint sensors may be provided in one of the light blocking regions Q2, as shown in FIG. 2c. Optionally, as shown in FIG. 3 and FIG. 4, the driving structure Tx includes: a second electrode 12, a first piezoelectric material layer 13 and a first electrode 11, which are sequentially provided on the base substrate 10; and the receiving structure Rx includes: a fourth electrode 22, a second piezoelectric material layer 23 and a third electrode 21, which are sequentially provided on the base substrate 10.

Specifically, each of the driving structure Tx and the receiving structure Rx of the ultrasonic fingerprint sensor is of a "sandwich structure", that is, an upper electrode and a lower electrode sandwich a piezoelectric material layer. Changes of the voltage between the first electrode 11 and the second electrode 12 in the driving structure Tx cause the first piezoelectric material provided between the first electrode 11 and the second electrode 12 to deform, so as to generate ultrasonic waves. Energy of the ultrasonic waves reflected by the finger and received by the third electrode 21 of the receiving structure Rx causes the second piezoelectric material to deform, resulting in a change in the voltage of the third electrode 21. When a fingerprint is pressed on the display screen, a pattern of valleys and ridges is generated on the display screen. Since there is air in the valleys, and the acoustic impedance of the air is greater than that of a solid. Therefore, when the ultrasonic waves generated by the driving structure Tx reach the valleys (air) and the ridges (solid), the valleys absorb less energy of the ultrasonic waves, and the ridges absorb more energy of ultrasonic waves. The ultrasonic waves reflected by the finger are received by the receiving structure Rx, and the energies of the ultrasonic waves reflected by the valleys and the ridges are different from each other, based on which the valleys and ridges of the fingerprints can be recognized.

The first piezoelectric material layer 13 in the driving structure Tx and the second piezoelectric material layer 23 in the receiving structure Rx are provided in a same layer and made of a same material. That is, the first piezoelectric material layer 13 in the driving structure Tx and the second piezoelectric material layer 23 in the receiving structure Rx can be simultaneously prepared in a single patterning process. Further, the first electrode 11 of the driving structure Tx and the third electrode 21 of the receiving structure Rx are provided in a same layer and made of a same material; the second electrode 12 of the driving structure Tx and the fourth electrode 22 of the receiving structure Rx are provided in a same layer and made of a same material. That is to say, the driving structure Tx and the receiving structure Rx are completely in a same plane. Compared with the prior art, the driving structure Tx can be closer to the touch body (for example, a finger), which is advantageous for the ultrasonic waves generated by the driving structure Tx to reach the finger, thus improving the touch accuracy.

Certainly, it is also possible that only the first electrode 11 of the driving structure Tx and the third electrode 21 of the receiving structure Rx are provided in a same layer and are made of a same material; or only the second electrode 12 of the driving structure Tx and the fourth electrode 22 of the receiving structure Rx are provided in a same layer and are made of a same material, which can also achieve the effect of reducing cost and increasing productivity.

It should be noted that the second electrode 12 of the driving structure Tx and the fourth electrode 22 of the receiving structure Rx are respectively applied with a fixed potential during operation, and fixed potentials applied to the second electrode 12 and the fourth electrode 22 may be the same or different.

Certainly, the display substrate in the present embodiment may further include a fingerprint detection circuit. As shown in FIG. 4, the fingerprint detection circuit is configured to determine the fingerprint information according to the electrical signal output by the third electrode 21 of the receiving structure Rx.

Figure 5A:
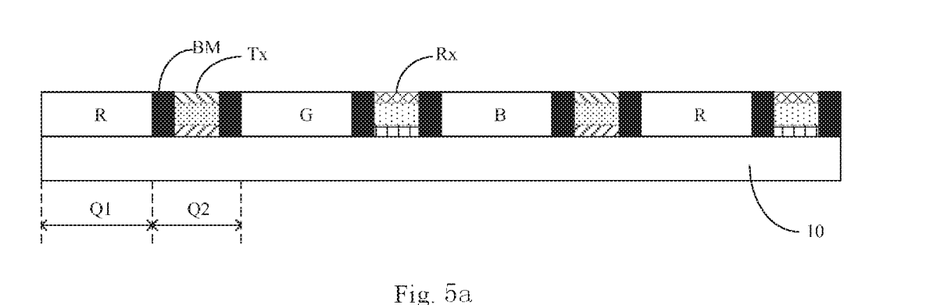
FIGS. 5a to 5c are schematic diagrams showing a display substrate being a color filter substrate according to an embodiment of the present disclosure.

As shown in FIG. 5a, as a specific implementation of the present embodiment, the display substrate in the present embodiment is a color filter substrate. The color filter substrate further includes color filters (for example, a red filter R, a green filter G, and a blue filter B) provided in the pixel regions Q1 and a black matrix BM provided in the light blocking regions Q2. Through holes are provided in the black matrix BM, and the driving structure Tx and the receiving structure Rx in each of the fingerprint recognition sensors are provided respectively in the through holes of the black matrix BM in two adjacent light blocking regions Q2.

In the present implementation, portions of areas (vias) in centers of light blocking lines of the black matrix BM are used as placement areas for receiving the ultrasonic fingerprint sensor, and the driving structure Tx and the receiving structure Rx are respectively placed in the placement areas, so that the driving structure Tx and the receiving structure Rx are provided in different positions, but in a same plane. In the present implementation, since the black matrix BM is provided, light leakage does not occur between the sub-pixels.

Figure 5B:
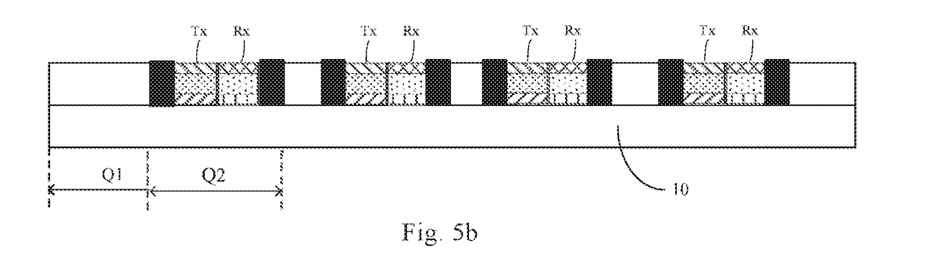

Except for the case where the driving structure Tx and the receiving structure Rx of each ultrasonic fingerprint sensor are separately provided in the black matrix BM in two adjacent light blocking regions Q2, the driving structure Tx and the receiving structure Rx of each ultrasonic fingerprint sensor may be provided in the black matrix BM in one of the light blocking regions Q2, as shown in FIG. 5b. In the present implementation, there is no need to add additional sub-pixels, which saves space in the display area. The material of the driving structure Tx and the receiving structure Rx is opaque, thus can block light. Therefore, in a case that the color filter substrate and the array substrate are aligned and assembled to form a display panel, external light can be prevented from being irradiated onto the array substrate, thus leakage current in the thin film transistor can be avoided.

Figure 5C:
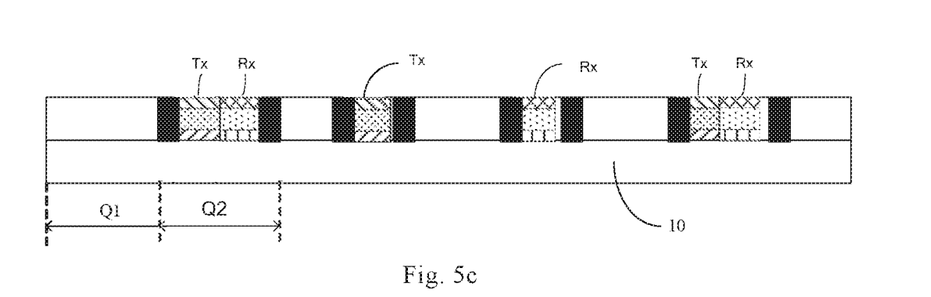

In addition, the driving structure Tx and the receiving structure Rx of each of a portion of the ultrasonic fingerprint sensors may be separately provided in the black matrix BM of two adjacent light blocking regions Q2, and the driving structure Tx and the receiving structure Rx of each of the other portion of the ultrasonic fingerprint sensors may be provided in the black matrix BM in one of the light blocking areas Q2, as shown in FIG. 5c.

Figure 6A:
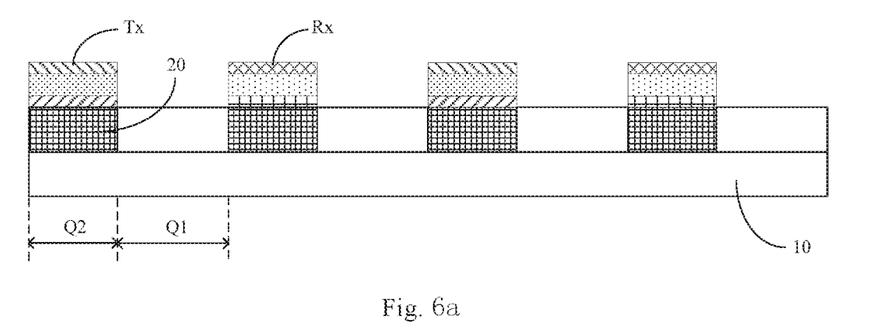
FIGS. 6a to 6c are schematic diagrams showing a display substrate being an array substrate according to an embodiment of the present disclosure.

As shown in FIG. 6a, as another specific implementation of the present embodiment, the display substrate in the present embodiment is an array substrate. A pixel driving circuit 20 is provided in the light blocking region Q2, and the driving structure Tx and the receiving structure Rx of each fingerprint recognition sensor are provided above two adjacent pixel driving circuits 20, respectively. Since the material of the driving structure Tx and the receiving structure Rx is opaque, thus can block light, so that leakage current of the thin film transistors caused by external light being irradiated onto the pixel driving circuits 20 can be prevented. Further, the arrangement of the black matrix BM on the color filter substrate provided opposite to the array substrate can be omitted.

Figure 6B:
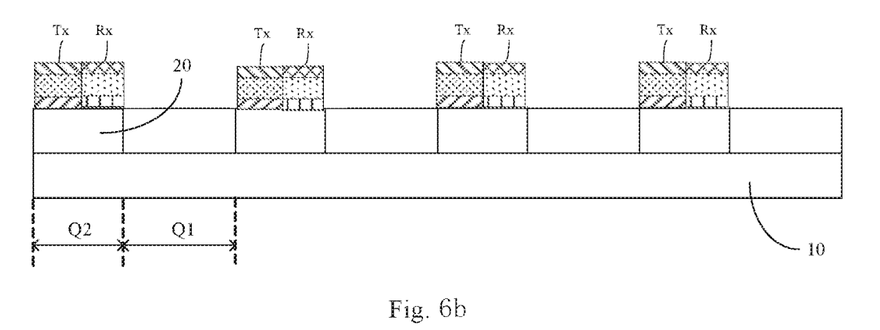
Figure 6C:
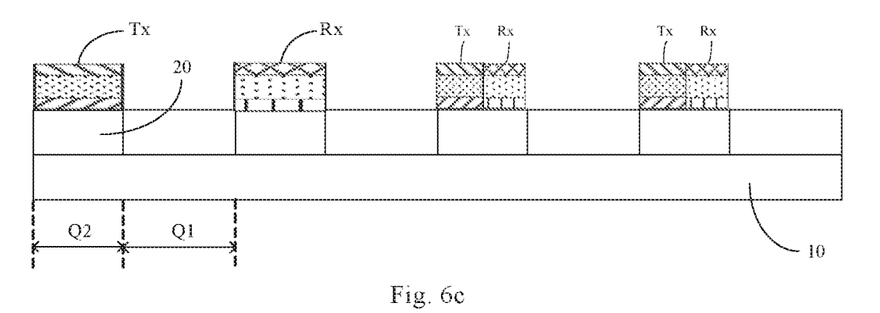

Also, in the present implementation, FIG. 6a shows a case where the driving structure Tx and the receiving structure Rx of each ultrasonic fingerprint sensor are separately provided above two adjacent pixel driving circuits 20, and FIG. 6b shows a case where the driving structure Tx and the receiving structure Rx of each ultrasonic fingerprint sensor are both provided above one of the pixel driving circuits 20. In addition, the driving structure Tx and the receiving structure Rx of each of a portion of the ultrasonic fingerprint sensors may be separately provided above two adjacent pixel driving circuits 20, and the driving structure Tx and the receiving structure Rx of each of the other portion of the ultrasonic fingerprint sensors may be provided above one of the pixel driving circuits 20, as shown in FIG. 6c.

Another embodiment of the present disclosure provides a driving method for the display substrate of any one of the foregoing embodiments. The driving method includes a fingerprint recognition stage and a display stage.

At the fingerprint recognition stage, a driving voltage is applied to the driving structure Tx of the ultrasonic fingerprint sensor, the driving structure Tx generates an ultrasonic signal; the ultrasonic signal reflected by the finger is received by the receiving structure Rx of the ultrasonic fingerprint sensor, and is converted into an electrical signal; and the fingerprint information is determined according to the electrical signal.

At the display stage, each row of pixel units in the display substrate is scanned progressively so that each pixel unit displays a corresponding gray scale.

In the present embodiment, since the driving structure Tx and the receiving structure Rx of the ultrasonic fingerprint sensor are provided in a same plane and they are relatively close to each other, especially in a case where the driving structure Tx and the receiving structure Rx of the ultrasonic fingerprint sensor are provided in one of the light blocking regions Q2 or the driving structure Tx and the receiving structure Rx of the ultrasonic fingerprint sensor are provided above one of the pixel driving circuits 20, interference between the transmitted signal and the received signal of the ultrasonic fingerprint sensor may occur, and the valleys and the ridges of the fingerprint are not recognized clearly, therefore, the signal transmitted by the driving structure Tx and the signal received by the receiving structure Rx are timing-controlled such that when the receiving structure Rx receives a signal, the driving structure Tx does not transmit a signal, thereby avoiding interference between the two signals. For example, as shown in FIG. 1, assuming that the distance from the first piezoelectric material of the driving structure Tx to the fingerprint is 0.5 mm and a propagation speed of the ultrasonic waves in the glass is 5000 m/s, the time required for the ultrasonic waves to reach the receiving structure Rx is $2 \times 10^{-7}$ s, if the driving structure Tx is controlled by using the timing of 1 GHz, the time required for the driving structure Tx to transmit the signal 100 times is $1 \times 10^{-7}$ s, that is, the driving structure Tx is controlled to continuously transmit the signal 100 times, and then the driving structure Tx is controlled to stop transmitting the signal, while controlling the receiving structure Rx to start receiving the reflected signal, thus the receiving structure Rx receiving signal cannot be affected even though the driving structure Tx transmits the signal 100 times. The frequency of 1 GHz described above is merely an example, in practical applications, the distance from the driving structure Tx to the finger, the timing frequency, and the like can be set as needed.

Embodiments of the present disclosure also provide a display device including the display substrate in the above embodiment. Therefore, the display device of the present embodiment has a fingerprint recognition function. Further, in the display device of the present embodiment, the driving structure and the receiving structure of the ultrasonic fingerprint sensor are both provided in the light blocking regions, and thus the aperture ratio of the display device is not affected. At the same time, the driving structure Tx and the receiving structure Rx are completely in a same plane. Compared with the prior art, the driving structure Tx can be closer to the touch body (such as a finger), which is advantageous for the ultrasonic waves generated by the driving structure Tx to reach the finger, so as to improve the touch accuracy. In addition, in a case where the driving structure Tx and the receiving structure Rx are separately provided in two adjacent light blocking regions Q2, the driving circuit structure and the receiving structure of each ultrasonic fingerprint sensor are separated by one pixel region, thereby avoiding interference occurring between the signal transmitted by the driving structure and the signal received by the receiving structure as much as possible, so that the valleys and ridges of the fingerprint can be recognized more clearly.

The display device may be a liquid crystal display device or an electroluminescence display device, or any product or component having a display function, such as a liquid crystal panel, an electronic paper, an OLED panel, a mobile phone, a tablet computer, a television, a display, a notebook computer, a digital photo frame, a navigator, and the like.

It should be understood that, the foregoing embodiments are only exemplary embodiments used for explaining the principle of the present disclosure, but the present disclosure is not limited thereto. Various variations and modifications may be made by a person skilled in the art without departing from the spirit and essence of the present invention, and these variations and modifications also fall into the protection scope of the present disclosure.

The invention claimed is:

1. A display substrate, comprising a plurality of pixel regions and light blocking regions between every two adjacent pixel regions and a plurality of ultrasonic fingerprint sensors, each of the ultrasonic fingerprint sensors comprises a driving structure and a receiving structure located in the light blocking region, wherein
the driving structure is configured to transmit an ultrasonic signal;
the receiving structure is configured to receive the ultrasonic signal reflected by a finger, and convert the ultrasonic signal into an electrical signal for determining fingerprint information,
the driving structure and the receiving structure are provided in a same plane,
the display substrate is a color filter substrate, a black matrix is provided in the light blocking regions, and through holes are provided in the black matrix, and the driving structure and the receiving structure in each of the fingerprint recognition sensors are provided in at least one of the through holes of the black matrix.

2. The display substrate according to claim 1, wherein the driving structure and the receiving structure of each ultrasonic fingerprint sensors are provided in two adjacent through holes of the black matrix respectively.

3. The display substrate according to claim 1, wherein the driving structure and the receiving structure of each ultrasonic fingerprint sensors are provided in one of the through holes of the black matrix.

4. The display substrate according to claim 1, wherein the driving structure and the receiving structure of each of a portion of ultrasonic fingerprint sensors are provided in one of the through holes of the black matrix, the driving structure and the receiving structure of each of the remaining portion of ultrasonic fingerprint sensors are provided in two adjacent through holes of the black matrix respectively.

5. The display substrate according to claim 2, wherein
the driving structure comprises a second electrode, a first piezoelectric material layer and a first electrode sequentially provided on the base substrate; and
the receiving structure comprises a fourth electrode, a second piezoelectric material layer and a third electrode sequentially provided on the base substrate.

6. The display substrate according to claim 5, wherein the first piezoelectric material layer and the second piezoelectric material layer are provided in a same layer and made of a same material.

7. The display substrate according to claim 5, wherein the first electrode and the third electrode are provided in a same layer and are made of a same material; and/or
the second electrode and the fourth electrode are provided in a same layer and made of a same material.

8. The display substrate according to claim 6, wherein the first electrode and the third electrode are provided in a same layer and are made of a same material; and/or
the second electrode and the fourth electrode are provided in a same layer and made of a same material.

9. The display substrate according to claim 1, further comprising a fingerprint detection circuit configured to determine fingerprint information according to an electrical signal output by the receiving structure.

10. A driving method for the display substrate according to claim 1, the driving method comprising steps of:
applying a driving voltage to the driving structure to drive the driving structure to generate an ultrasonic signal;
receiving, by the receiving structure, the ultrasonic signal reflected by a finger; and
determining fingerprint information by converting the ultrasonic signal into an electrical signal.

11. The driving method according to claim 10, wherein while the step of receiving, by the receiving structure, the ultrasonic signal reflected by the finger, and the step of determining fingerprint information by converting the ultrasonic signal into the electrical signal are performed, no driving voltage is applied to the driving structure.

12. A display device, comprising the display substrate according to claim 1.

13. A display device, comprising the display substrate according to claim 2.

14. A display device, comprising the display substrate according to claim 3.

15. A display device, comprising the display substrate according to claim 4.

16. A display device, comprising the display substrate according to claim 5.

17. A display device, comprising the display substrate according to claim 6.

18. A display device, comprising the display substrate according to claim 7.

19. A display device, comprising the display substrate according to claim 8.

20. A display device, comprising the display substrate according to claim 9.

* * * * *